INVENTOR.
B. L. THORMAN

INVENTOR.
B. L. THORMAN

3,513,736
FLUID CONTROL SYSTEM FOR ARTICLE HANDLING EQUIPMENT
Baxter L. Thorman, Bartlesville, Okla., assignor to Phillips Petroleum Company, a corporation of Delaware
Filed June 10, 1968, Ser. No. 735,634
Int. Cl. B23b 7/00; B26d 5/28
U.S. Cl. 82—48　　　　　　　　　　　　　　　　8 Claims

ABSTRACT OF THE DISCLOSURE

Article handling manipulations, such as cutting an intermediate length of tubing into a plurality of short sections, are controlled by a fluid control system comprising a sensing unit, a first fluid means in communication with this sensing unit for actuating article handling manipulations as a delayed response to a signal from the sensing unit, and a second fluid means in communication with the sensing unit for shutting off the means for actuating the article handling manipulations in case of a malfunction.

BACKGROUND OF THE INVENTION

This invention relates to fluid control systems for article handling equipment.

It is known to use a photoelectric cell in combination with an electrically operated mechanical time delay relay to effect an operation in response to an interruption of light to the photocell by the passage of a workpiece. It has been found desirable in certain operations, for instance in cutting intermediate sized lengths of tubing into a plurality of shorter lengths, to utilize the signal generated by the passage of the workpiece for a dual function. The first part of this dual function is to activate a time delay means to activate a cutting means, and the second function is to activate a timer means which will reset if the workpiece proceeds through the work station in a normal manner, but which will shut the equipment off if the workpiece becomes jammed.

Such an operation could be effected with a combination of ordinary electrical timer relays and time delay relays. However, an article handling operation such as is encountered in a commercial operation usually involves high speed handling of a large number of individual units, thus subjecting the mechanical relays to constant usage. As with any equipment utilizing moving parts, this results in undesired maintenance and replacement of these mechanical relays.

SUMMARY OF THE INVENTION

It is an object of this invention to provide a fluid control system for article handling equipment; and It is a further object of this invention to control manipulative operations in delayed response to a signal, which signal operates to shut the equipment off in case of a malfunction, all without the use of moving parts.

In accordance with this invention a fluid sensing unit generates a signal in response to the passage of an article, which signal acts through a fluid time delay means to activate a manipulative operation on said article, and which signal further acts through a fluid timer means to shut off the article handling equipment in case of a malfunction.

BRIEF DESCRIPTION OF THE DRAWINGS

In the drawings, forming a part hereof, in which like reference characters denote like parts in the various views.

DESCRIPTION OF THE PREFERRED EMBODIMENTS

Figure 1:
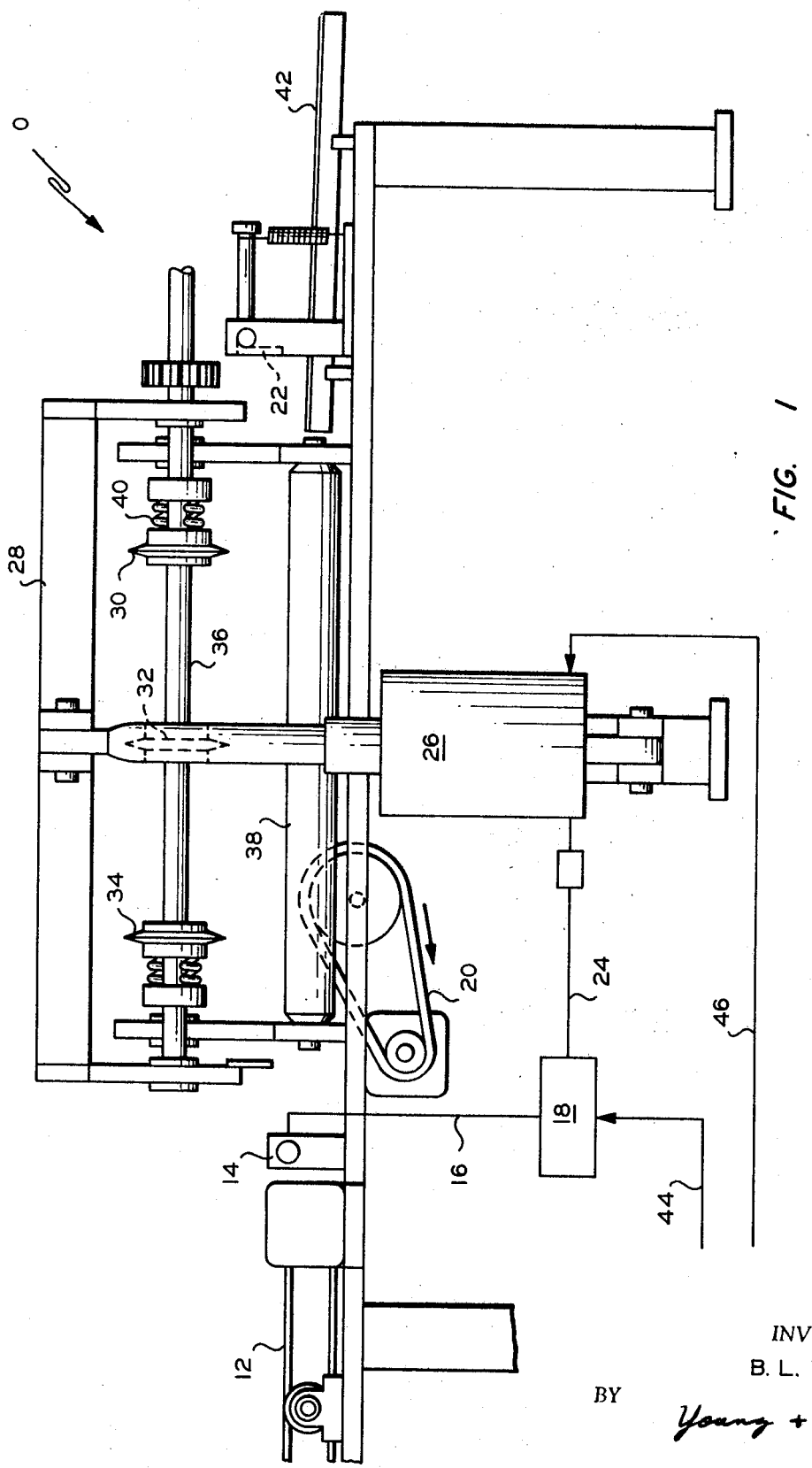
FIG. 1 is a plan view of an article handling machine employing the fluid control of the instant invention.

Referring now to FIG. 1 there is shown an article handling machine in the form of a tubing cutter designated by reference character 10. Intermediate lengths of tubing to be cut are conveyed by means of conveying means 12. The intermediate lengths of tubing as they pass fluid eye or sensor 14 cause a signal to be generated which is carried via conduit 16 to fluid control unit designated generally by reference character 18. The intermediate length of tubing is moved on forward by means of belt 20 until a first end of the intermediate length of tubing comes to rest against stop mechanism 22. The signal generated by the passage of the workpiece past the fluid sensor activates a fluid time delay relay means as will be described hereinafter, which after the preset time which is sufficient to allow the workpiece to become positioned against stop 22, generates an output signal carried via line 24 to activate air cylinder 26 to retract which causes frame 28 carrying cutting blades 30, 32, and 34 to descend so as to cut the tubular workpiece into four smaller lengths. Cutting blades 30 and 34 are slidably attached to shaft 36. The tubular workpiece as it is held against stop member 22 rests in a cradle formed by roller 38 and an identical roller behind roller 38. Shaft 36 is caused to rotate by means not shown and as the cutting blades contact the tubular workpiece the tubular workpiece is caused to rotate which then causes freely pinned rollers 38 to rotate. Cutting blade 32 is fixedly attached to shaft 36. Blades 30 and 34 are slidably keyed to shaft 36 and are biased toward blade 32 by means of springs 40. In this way, as the cut proceeds, blades 30 and 34 are free to slide axially outwardly in order to compensate for the wedging effect of the cutting blades, so as to achieve a square cut. After the workpiece has been cut into a plurality of smaller lengths, the first length drops down below stop mechanism 22 into trough 42 where it is recovered. The other cut pieces of tubing are thereafter pushed out by the incoming workpiece. After a preset time the air cylinder is caused to extend so as to raise frame 28 which carries the cutter blades. The signal carried via line 16 also activates a second fluid timing means as will be further described hereinafter. If the workpiece becomes jammed so that it remains in front of fluid sensor 14 for longer than a preset time, as will be described hereinafter, then the fluid control unit 18 causes the mechanism to be shut down. In addition to shutting down the mechanism in response to equipment malfunction, this signal can also be used to set off an alarm. Power air for the fluid amplifier is carried via conduit 44. Generally, the power air for the pure fluid circuits is at a pressure of 0.1 to 20 p.s.i.g., preferably 1 to 7 p.s.i.g. High pressure air for the air cylinder is carried via conduit 46.

Figure 2:
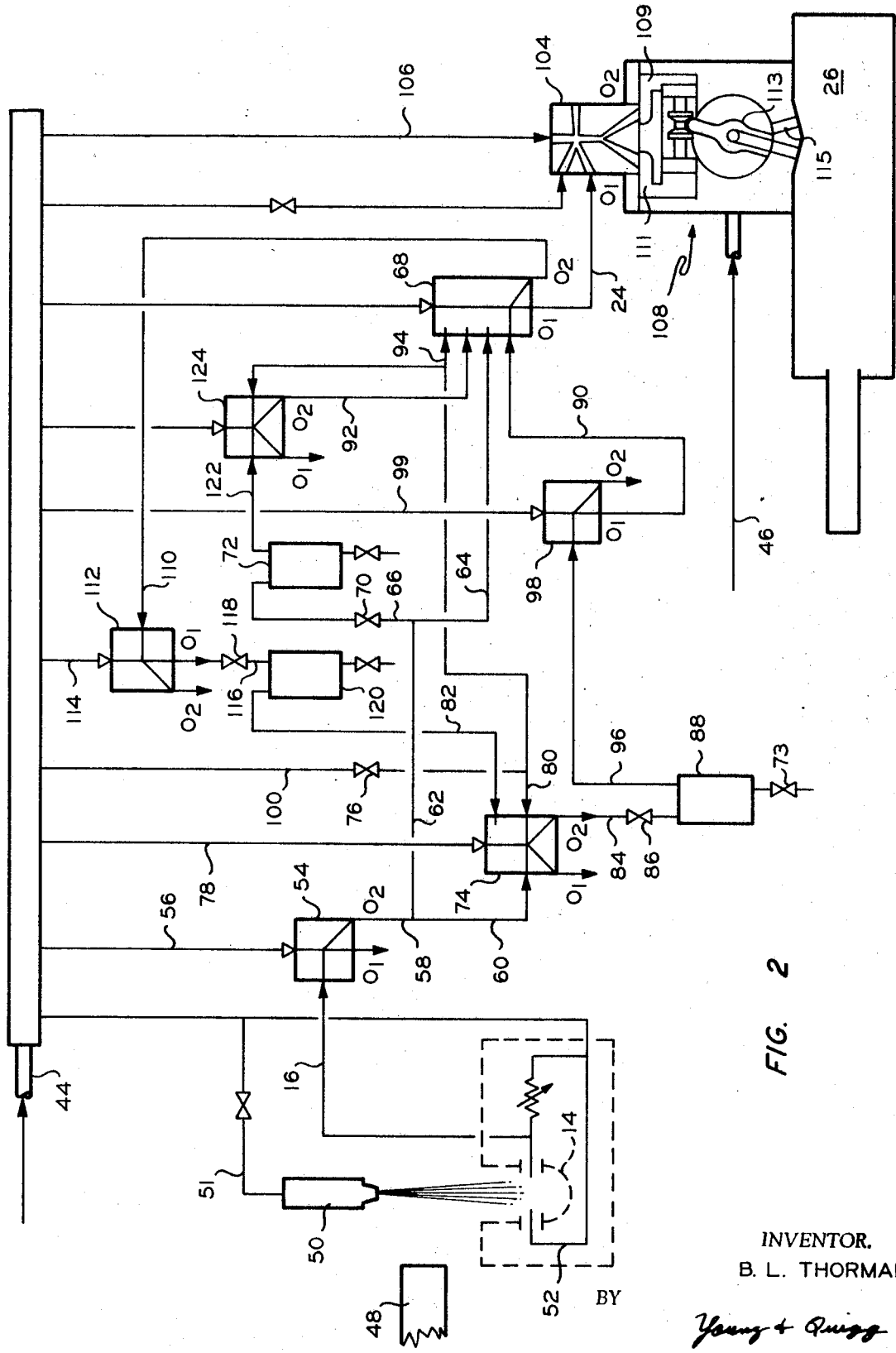
FIG. 2 is a schematic representation of the fluid control system.

Referring now to FIG. 2, the pure fluid control means is shown in schematic representation. A tubular workpiece 48 to be handled passes between sensing jet 50 and sensor unit designated generally by reference character 14. This fluid eye can be, for instance, the sensor jet manufactured by Howie Sensor Corporation. Sensing jet 50 is connected with power air conduit 44 via conduit 51 and directs a stream of air across the path where workpiece 48 will cross. Power air is carried to sensor unit 14 by conduit 52. So long as no parison is in the path of the air flow from the sensing jet 50 this air flow from the jet disrupts the flow of power air carried by line 52 so that output signal conduit 16 carries little or no air. When workpiece 48 passes in front of sensing jet 50, thus blocking the flow of air from this jet, the flow of air from conduit 52 is no longer disrupted and therefore sensor 14 emits a signal by way of air carried by output signal conduit 16. The first logic element in the fluid control unit is monostable fluid circuit means 54. Power air is supplied to monostable device 54 via conduit 56. Monostable device 54 can be, for instance, a two input Corning NOR element with one of the inputs simply not being used, or it can be a simple monostable wall attachment amplifier with only one input as shown in the drawing; such devices are commercially available and are described on page 157 of the June 24, 1965, issue of "Machine Design." Monostable device 54 has two output ducts labeled $O_1$ and $O_2$. Position $O_1$ is the stable position and is used in this system as an exhaust, that is, it does not control anything. As long as there is no parison in front of the sensing jet 50, there is no signal carried by conduit 16 and, consequently, element 54 is in the $O_1$ output position. When workpiece 48 passes in front of the fluid stream from jet 50, an output signal carried by conduit 16 causes the output from monostable device 54 to switch from the $O_1$ to the $O_2$ position. That is, an output of air flows from duct $O_2$ via conduit 58. Conduit 58 splits into conduits 60 and 62. Conduit 62 further divides into conduits 64 and 66. Thus the immediate effect of workpiece 48 passing in front of sensing jet 50 is to substantially simultaneously send a signal to three separate units: (1) via line 64 to NOR element 68; (2) via line 66 through fluid resistor 70 to fluid capacitor 72; and (3) via line 60 to fluid flip-flop element 74. The fluid resistors of this unit, such as resistor 70, can simply be an adjustable orifice or restriction to the passage of fluid through the conduit. The fluid capacitors of this unit can simply be hollow chambers. These capacitors serve as time delay elements; depending on the size of the capacitor, the delay between the time the fluid signal begins to flow into the chamber, and the time a sufficient output is achieved to signal the next unit in the circuit can easily be varied from a matter of a fraction of a second to a matter of minutes. By utilizing a bleed valve such as valve 73 in the capacitor the same time interval can be achieved with a smaller sized capacitor.

The fluid flip-flop devices of this unit can be, for instance, Corning bistable fluid circuit means. Bistable devices such as the wall attachment amplifiers shown on page 156 of the June 24, 1965, issue of "Machine Design" are suitable. At the initial startup of this control unit flip-flop 74 and NOR element 68 are preset in the $O_1$ and $O_2$ positions, respectively, by means of manual set valve 76. Power air is fed to flip-flop 74 via conduit 78. Flip-flop 74 thus has power input conduit 78 and three control inputs, (1) via a duct connected with line 60 for switching the device from the $O_1$ stable position to the $O_2$ stable position; (2) via a duct connected with conduit 80 which conduit is connected with set switch 76 for switching the flip-flop from the $O_2$ position to the $O_1$ position; and (3) an input connected with conduit 82 (which will be explained further hereinafter) also for switching flip-flop 74 from the stable $O_2$ position to the stable $O_1$ position. The $O_1$ output of flip-flop 74 is simply vented to the atmosphere and controls nothing. The $O_2$ output is connected via conduit 84 through fluid resistor 86 to fluidic capacitor 88.

At this point it is necessary to describe in detail the operation of NOR element 68. Fluid circuit means 68 is a monostable OR device viewed from the $O_2$ output, or viewed from the $O_1$ output duct a NOR element; it is similar to circuit means 54 except that it has four inputs. The $O_1$ output is the stable position. An input via any of conduits 64, 90, 92, or 94 switches the output from NOR element 68 from the stable $O_1$ position to the $O_2$ output position. An output from the $O_1$ position of NOR element 68 is required to ultimately activate the article handling manipulation, that is, to cause cylinder 26 to retract. Thus during startup it is held in the $O_2$ position so as not to have the cylinder activated by means of an input from manual set line 94. After the operation is begun manual set valve 76 is shut off. NOR element 68 is still held in the $O_2$ position, however, by the input carried by line 90. During the time the parison is in front of the sensing jet 50 NOR element 68 is also held in the $O_2$ position by means of the input carried by conduit 64. It is noted at this point that two separate inputs cause the element 68 to be in the $O_2$ position. The reason for having two separate inputs for accomplishing the same thing will be described in detail hereinafter.

Three operations, therefore, are transpiring as the parison passes in front of the sensing jet 50: NOR element 68 is held in the $O_2$ position so as not to activate the cylinder 26 and fluid capacitors 72 and 88 are effecting time delay operations. Fluid capacitor 88 is set to time out first. When this happens a signal is carried via conduit 96 to monostable device 98, which is identical to monostable device 54 in construction although it is the stable $O_1$ output rather than the $O_2$ output which is utilized in the operation. Power air is fed to monostable device 98 via conduit 99. So long as there is no input to monostable device 98 an output is received via output duct $O_1$. As noted hereinbefore, output from duct $O_1$, carried by conduit 90, is fed as an input to NOR element 68 to lock NOR element 68 in the $O_2$ position. This is the situation during the time the fluid capacitor 88 is timing out. When fluid capacitor 88 times out and the signal carried via conduit 96 causes monostable device 98 to switch to the $O_2$ position, there is no longer any input carried via conduit 90 to NOR element 68. If by this time the parison has passed through the area detected by the sensing jet, there is no longer any input to the NOR element 68 from line 64. There is no input to NOR element 68 from line 92 because fluid capacitor 72 is set to time out after a longer period of time. As noted hereinabove, there is no input from conduit 94 since this is used only during the startup.

The reason for having conduit 64 is as follows. The purpose of fluid capacitor 88 is to effect a time delay after the workpiece first interrupts the fluid jet so as to allow time for the workpiece to become properly positioned for the manipulative operation to be carried out. If, however, the workpiece should become jammed, and line 64 were absent, the cylinder 26 would be activated as soon as timer 88 timed out since capacitor 72 is set to time out at a considerably longer time and therefore would not be timed out as yet. The signal from 64, then, serves only to hold NOR element 68 in the $O_2$ position in case of a malfunction. That is, in normal operation with no malfunction, conduit 64 is not needed, but serves only as a backup safety device.

With no input being received by NOR element 68 from any of conduits 94, 92, 64, or 90, NOR element 68 switches to the stable $O_1$ position. This effects two operations. Frist, the output signal from the $O_1$ output duct of NOR element 68 is carried via conduit 24 to OR element 104. Power air is fed to OR element 104 via conduit 106.

to switch from the stable $O_1$ position to the $O_2$ position. This activates relay 108 which causes cylinder 26 to retract by allowing control fluid into chamber 109 which causes operating shuttle 111 to shift from right to left causing rotor 113 which contains the power supply channal to direct the high pressure air to output port 115. Relay 108 can be, for instance, a fluid industrial control relay, such as is sold by Brown and Sharpe, Manchester, Mich. This relay contains the only moving parts in the entire control unit. Second, the output from the $O_2$ output duct of element 68 carried via conduit 110 is the input for monostable fluid circuit means 112. Monostable device 112 is identical to monostable device 54. Power air is fed to monostable device 112 via conduit 114. Fluid monostable device 112 has stable output duct $O_1$ connected via line 116 with fluid resistor 118 and output duct $O_2$ which is simply exhausted to the atmosphere and does not control any thing. Discontinuance of the signal which had been carried via conduit 110 to keep monostable device 112 in the $O_2$ position, as a result of element 68 being switched to the $O_1$ position, allows monostable element 112 to switch to the $O_1$ position. The signal thus generated from the $O_1$ position, carried via conduit 116 to resistor 118, is introduced into fluid capacitor 120 which acts as a third timing device. This timing device is set for a time which is shorter than the remaining time for which capacitor 72 is set. The purpose of fluid time delay capacitor 120 is to control the length of time cylinder 26 is retracted. When fluid capacitor 120 times out an output signal carried via line 82 is input to flip-flop element 74 causing element 74 to be switched from the stable $O_2$ to the stable $O_1$ position. This causes a discontinuance of the signal carried via conduit 84 which allows monostable element 98 to revert to the stable $O_1$ position thus generating a signal which is introduced into the input of NOR element 68 via conduit 90. This switches NOR element 68 to to $O_2$ position. This discontinues the signal previously carried by conduit 24 to monostable device 104 thus allowing it to revert to the $O_1$ position which causes relay 108 to extend the cylinder, thus completing a cycle. This switching of NOR element 68 from the $O_1$ position to the $O_2$ position in addition to ultimately extending the cylinder 26 (thus raising the cutting means, i.e., shutting off the cutting operation) also causes a signal to be sent out by conduit 110 to in effect rest the time delay mechanism represented by capacitor 120 by switching element 112 to the $O_2$ position thus allowing capacitor 120 to vent. The time delay mechanism represented by capacitor 72 quit timing and was automatically reset as soon as the workpiece passed beyond the sensing jet.

Had the mechanism jammed so that the workpiece remained in front of the sensing jet, the time delay mechanism represented by capacitor 72 would have timed out and generated an output signal carried via conduit 122 which would have caused fluid flip-flop element 124 to switch from the stable $O_1$ to the stable $O_2$ position thus sending an output signal via conduit 92 which would maintain element 68 in the $O_2$ position and thus maintaining the absence of a signal to NOR element 104, thus keeping element 104 in the stable $O_1$ position which keeps the mechanism shut off. In normal operation the parison will pass through the sensing jet and when the parison has completed its passage in front of the sensing jet the time delay represented by capacitor 72 will be reset automatically and thus will never time out.

The following is a simplified description of the operation. The parison passing in front of the sensing jet causes a signal to be sent out from the sensor unit which: (1) starts fluid timer 72; (2) starts fluid timer 88, which is in effect a time delay relay; and (3) holds NOR element 68 in the $O_2$ position so as to ineffect keep the manipulative operation shut off. As soon as time delay relay 88 times out NOR element 68 which is no longer held in the $O_2$ position by either a signal from monostable element 98 or a signal directly from monostable element 54 reverts to the $O_1$ position to activate the article handling manipulation and at the same time the withdrawal of the signal from monosable element 112 starts fluid timer 120 which, when it times out, sends a signal to flop-flop element 74 switching it from the stable $O_2$ to the stable $O_1$ position thus causing cylinder 26 to extend and in effect shut off the operation. Should a malfunction occur so that a parison becomes jammed in front of the sensor jet, the cutting mechanism will in effect be kept turned off by the action of the signal from line 64.

The timer represented by capacitor 72 is in the circuit as a safety feature. While the cutter is kept shut off so long as the parison is in front of the jet by means of the signal carried by line 64, if the parison jams and remains in the way of the jet for a long enough period of time for fluid time delay relay represented by capacitor 88 to time out then the cutter would otherwise be activated the instant the parison was removed; capacitor 72 by being set for a long period of time which is longer than the combined times of 88 and 120 will time out in the event of a malfunction after a given number of seconds and cause flip-flop unit 124 to switch to the stable $O_2$ position which will keep the cutter mechanism permanently shut off until such time as an opposite signal is affirmatively given to flip-flop 124.

While this invention has been described in reference to a cutter for tubular articles, it ise apparent that the fluidic control system of the instant invention can find application in any article handling equipment where it is desired to conduct a manipulative operation on a workpiece in delayed response to the time the workpiece passes a sensor means and where it is desired to automatically shut down the operation if the mechanism becomes jammed.

The signal from flip-flop element 124 carried via line 92 can be fed to a mechanism to activate an alarm instead of or in addition to being fed to the NOR element 68.

The term "fluid" has been used to describe the circuit devices of this invention; these devices are also referred to as "fluidic devices" or "pure fluid" devices, these terms being considered interchangeable.

While this invention has been described in detail for the purpose of illustration it is not to be construed as limited thereby but is intended to cover all changes and modifications within the spirit and scope thereof.

I claim:
1. A fluid control system for article handling equipment comprising in combination:
  sensor means to create a fluid signal from said sensor in response to a position of a workpiece;
  a first fluid timing means;
  a first fluid switch means having on and off positions;
  first fluid circuit means connecting said sensor with said first fluid timing means for starting said timing means in response to said fluid signal from said sensor;
  second fluid circuit means connecting said sensor with said first fluid switch means for holding said switch in the off position so long as said signal is being generated by said sensor;
  second fluid switch means;
  third fluid circuit means connecting said second fluid switch means with said first fluid switch means to hold said first fluid switch means in the off position after said fluid signal from said sensor has ended;
  fourth fluid circuit means connecting said first fluid timing means with said second fluid switch means so that when said timer times out said second fluid switch is caused to generate a signal which switches said first fluid switch from the off to the on position;
  second fluid timing means;
  fifth fluid circuit means connecting said first fluid switch means with said second fluid timing means so as to start said second fluid timing means in response to said first fluid switch means switching from the off to the on position; and sixth fluid circuit means connecting said second fluid timing means and said first fluid timing means so as to reset said first fluid timing means and switch said first fluid switch means from on to off in response to said second fluid timing means timing out.

2. Apparatus according to claim 1 comprising in addition:

third fluid timing means;

seventh fluid circuit means communicating between said sensor and said third fluid timing means for starting said third fluid timing means in response to said fluid signal from said sensor, said third fluid timer being set for a time which is greater than the combined times of first and second fluid timing means; and eighth fluid circuit means connecting said third fluid timing means and said first fluid switch means for permanently holding said switch in the off position in response to a signal generated by said third fluid timing means timing out.

3. A fluid control system for article handling equipment comprising in combination:

sensor means to create a first fluid signal in response to a position of a workpiece;

a first monostable fluid circuit means having a power input channel means, a first output channel means representing a stable position, a second output channel means representing a second position, and a control input channel means;

first conduit means through which fluid signals can flow connecting said sensor means and said input of said first monostable fluid circuit means;

a first bistable fluid circuit means having a power input channel means, a first output channel means, a second output channel means, a first control input channel means, and a second control input channel means;

second conduit means through which fluid signals can flow connecting said second output of said first monostable fluid circuit means with said first input of said first bistable fluid circuit means;

a first fluid capacitor chamber;

third conduit means through which fluid signals can flow connecting said second output of said first bistable fluid circuit means with said first capacitance chamber;

second monostable fluid circuit means having a power input channel means, a first output channel means representing a stable position, a second output channel means representing a second position, and a control input channel means;

fourth conduit means through which signals can flow connecting said first capacitor chamber with said control input channel means of said second monostable device;

a third monostable fluid circuit means having a power input channel means, a first output channel means representing a stable position, a second output channel means representing a second position, a first control input channel means, and a second control input channel means;

fifth conduit means through which fluid signals can flow connecting said first output of said second monostable fluid circuit means with said second input of said third monostable fluid circuit means;

sixth conduit means through which fluid signals can flow connecting said second conduit means with said first input of said third monostable fluid circuit means;

fourth monostable fluid circuit means having a power input channel means, a first output channel means representing a stable position, a second output channel means representing a second position, and a control input channel means;

seventh conduit means through which fluid signals can flow connecting said first output of said third monostable fluid circuit means with said input of said fourth monostable fluid circuit means;

fifth monostable fluid circuit means having a power input channel means, a first output channel means representing a stable position, a second output channel means representing a second position, and a control input channel means;

eighth conduit means through which fluid signals can flow connecting said second output of said third monostable fluid circuit means with said control input of said fifth monostable fluid circuit means;

a second capacitor chamber;

a ninth conduit means through which fluid signals can flow connecting said first output of said fifth monostable fluid circuit means with said second capacitance chamber;

a tenth conduit means through which fluid signals can flow connecting said second capacitance chamber with said second input of said first bistable fluid circuit means; and means for effecting article handling manipulation in response to a signal from said second output of said fourth monostable device.

4. A pure fluid control in accordance with claim 3 wherein said third monostable fluid circuit means has a third control input channel means, comprising in addition;

a second bistable fluid circuit means having a power input channel means, a first output channel means, a second output channel means, and a control input channel means;

a third capacitance chamber;

eleventh conduit means through which signals can flow connecting said sixth conduit means with said third capacitance chamber;

twelfth conduit means through which signals can flow connecting said third capacitance chamber with said control input of said second bistable fluid circuit means such that a signal carried by said twelfth conduit means causes a power stream of said second bistable fluid circuit means to be switched from said first output to said second output; and thirteenth conduit means through which fluid signals can flow connecting said second output of said second bistable fluid circuit means with said third control input of said third monostable fluid circuit means such that a signal carried by said conduit causes said power stream of said third monostable fluid circuit means to be diverted from said first output to said second output.

5. A pure fluid control system according to claim 4 wherein said first bistable fluid circuit means has a third control input channel means, and said third monostable fluid circuit means has a fourth control input channel means, said system comprising in addition:

a manual set valve;

a fourteenth conduit means for carrying a flow of fluid;

a fifteenth conduit means through which fluid can flow connecting said fourteenth conduit with said third control input of said first bistable fluid circuit means such that a flow of fluid through said fifteenth conduit causes said power stream of said first bistable fluid circuit means to be switched from said second output to said first output; and a sixteenth conduit means through which fluid can flow connecting said fourteenth conduit with said fourth control input of said third monostable fluid circuit means such that the flow of fluid through said sixteenth conduit causes said power stream of said third monostable fluid circuit means to be diverted from said first output to said second output.

6. A pure fluid control system according to claim 4 wherein said third conduit means has a fluid resistor orifice, said ninth conduit means has a fluid resistor orifice, and said eleventh conduit has a fluid resistor orifice.

7. A pure fluid control system according to claim 4 wherein said capacitance chambers have a bleed means.

8. A pure fluid control system according to claim 4 wherein said means for effecting said article manipulations comprises a fluid relay having a rotor, said fluid relay being in communication with said second output of said fourth monostable fluid circuit means so that said relay is rotated in response to a signal from said second output of said fourth monostable fluid circuit means so as to direct the flow of high pressure air to an outlet port.

References Cited

UNITED STATES PATENTS

| | | | |
|---|---|---|---|
| 1,698,250 | 1/1929 | Adams | 82—48 |
| 2,481,446 | 9/1949 | Quijada | 82—48 |
| 3,160,045 | 12/1964 | Newgard | 83—63 |
| 3,229,556 | 1/1966 | Jensen | 83—211 X |

FRANK T. YOST, Primary Examiner

U.S. Cl. X.R.

82—101, 102; 83—63, 211, 269